United States Patent [19]
Wolfrath et al.

[11] Patent Number: 5,832,910
[45] Date of Patent: Nov. 10, 1998

[54] SWIVEL MOUNT

[76] Inventors: Richard L. Wolfrath, Hwy. 45 South; Michael Herminath, 806 N. Water, both of New London, Wis. 54961

[21] Appl. No.: 803,830

[22] Filed: Feb. 24, 1997

[51] Int. Cl.[6] ............................... F41B 5/14; F16B 47/00
[52] U.S. Cl. .............................. 124/23.1; 124/1; 124/80; 124/86; 248/205.3
[58] Field of Search ............................. 124/1, 23.1, 25.6, 124/86, 88, 80; 248/205.3, 205.5

[56] References Cited

U.S. PATENT DOCUMENTS

| | | | |
|---|---|---|---|
| 2,045,672 | 6/1936 | Oliveri | 248/205.5 |
| 2,806,314 | 9/1957 | Moran | 248/205.5 X |
| 3,632,071 | 1/1972 | Cameron et al. | 248/205.3 X |
| 4,093,165 | 6/1978 | Sussman | 248/205.5 X |
| 4,167,259 | 9/1979 | Bury | 248/205.3 |
| 5,323,993 | 6/1994 | Questel et al. | 248/205.3 |
| 5,487,374 | 1/1996 | Herminath et al. | 124/86 |
| 5,520,031 | 5/1996 | Davidge | 248/205.3 X |

FOREIGN PATENT DOCUMENTS 6-109014  4/1994  Japan .................................. 248/205.3

*Primary Examiner*—John A. Ricci
*Attorney, Agent, or Firm*—Russell L. Johnson, Patent Agent

[57] ABSTRACT

A swivel mount for mounting strap swivels to flexible structures is provided. The mount is formed of molded plastic material that is flexible in thin sections and rigid in heavy sections. A swivel mounting post having a heavy section is formed to project from a base that has a thin section, thereby providing a flexible mounting for securing the rigid post to a flexible structure. The preferred method of securing the swivel mount to the flexible structure is with an adhesive foam tape.

7 Claims, 4 Drawing Sheets

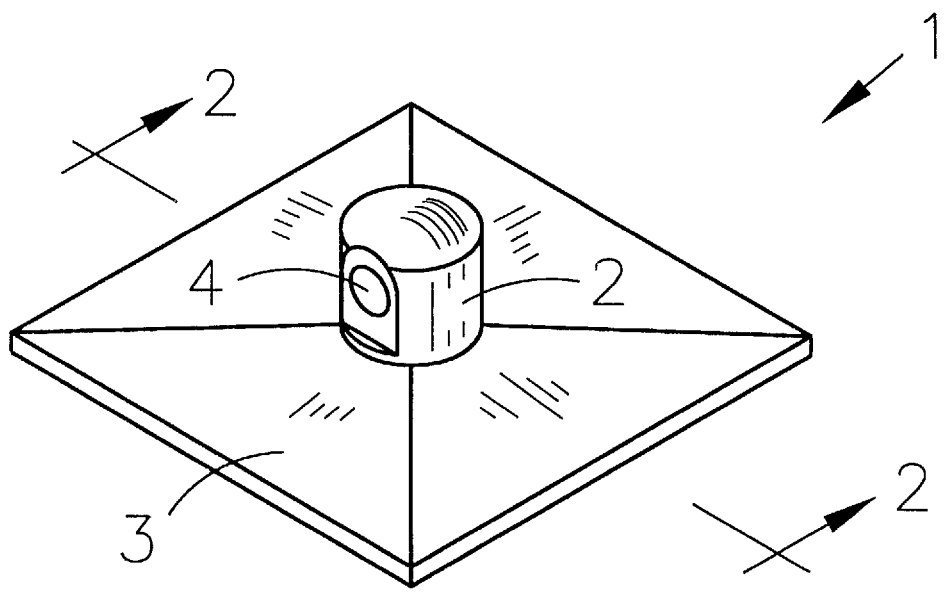
FIG. 1
FIG. 2
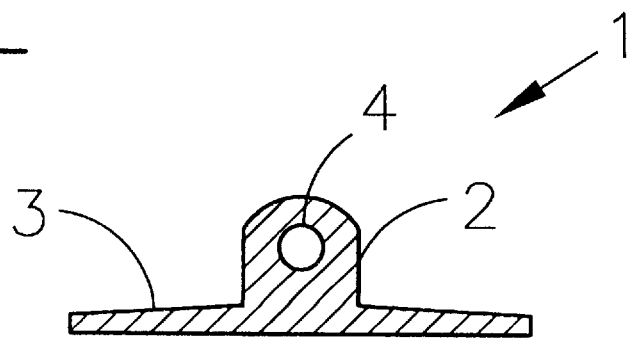

SWIVEL MOUNT

FIELD

This invention relates to mounting studs for strap swivels of the type used for joining stabilizing straps to hand held devices.

More particularly, this invention relates to swivel attachment studs which are attachable to hand held devices wherein the structures of the hand held device does not permit the convenient attachment of a conventional strap swivel stud.

BACKGROUND

The swivel mounts used to attach and detach sling straps to shoulder fired rifles are not suitable for use in securing stabilizing straps to hand held devices such as cameras, telescopes, bows, and the like. This is true, in part, because these hand held devices do not provide an adequate structural base for securing such swivel mounts to the devices. Tripods and other such rigid supports are the most commonly employed means presently in use for stabilizing such devices.

The inventors of this invention have received U.S. Pat. No. 5,487,374, for a Bow Stabilizer and positioning device. Embodiments of that invention provide means for attaching and detaching an adjustable strap to a bow by means of a coupling element secured to the bow. The attachment means taught in the Bow Stabilizer patent serve their purposes well. However, certain improvements in the means for securing the stabilizing strap to the bow have served to provide greater reliability and utility to the attachment means taught in the above cited patent.

It was found that hook and loop fasteners and cam lock securements can, in some configurations, over time, when subjected to repeated firing of the bow, respond to the flexing of the bow limb and the G-forces present in firing a bow to become loosened and in some instances release entirely.

Strap swivels, such as those used to secure slings to rifles were found to be unsuitable for use in detachably securing the stabilizing strap of the above described bow stabilizer for a number of reasons related to securing the mounting stud of the swivel to the bow. In general, the limbs of bows can not be machined, or modified to any significant extent without changing the flexing characteristics of the limb. The normal procedure for securing the sling swivel mounting stud to a rifle is to recess the mounting plate of the mounting stud into the stock of the rifle and then to secure the plate in place with substantial threaded fasteners. This procedure is obviously not practical for bows or articles that have relatively thin walled structures.

Strap swivels, such as those used to secure slings to rifles have mounting plates that are for all practical purposes, rigid. The adhesive bonding of such heavy rigid plates to bow limbs that have to flex, or to thin walled structures that can flex, presents real potentials of the adhesive bond being progressively weakened by repeated flexors of the structure to which the mounting plate is secured.

OBJECTS

It is therefore, an object of this invention to provide a strap swivel mounting stud structure that does not require for its use, the physical modification of the structure to which it is attached.

It is further an object of this invention to provide the mounting stud structure as described above wherein the mounting stud and its mounting plate are formed as a single unit.

It is further an object of this invention to provide the mounting stud structure as described above wherein the structure is adhesively securable to a supporting surface.

It is further an object of this invention to provide the mounting stud structure as described above wherein the mounting plate is tapered so as to permit the mounting plate to accommodate to and move with the flexing of the structure to which it is attached.

It is further an object of this invention to provide the mounting stud structure as described above wherein the structure is low in cost to manufacture and reliable in use.

Other objects will become apparent from the following specifications, claims and drawings.

PRIOR ART

The most relevant prior art known to the inventors are the strap swivels and swivel attachment studs that are widely used in the gun art, and the applicant's own patent; U.S. Pat. No. 5,487,374, to Herminath et.al., Jan. 30, 1996 which is hereby incorporated herein by reference. Such strap swivels and swivel studs and their mounts are notoriously well known in the art. The Herminath patent teaches a stabilizing tether for a bow wherein the tether is attachably and detachably secured to the bow by separable couplings and fasteners.

The applicants know of no prior art one piece swivel studs and stud mounts that are adhesively securable to flexible surfaces so that the mount is accommodating to the flexing of the surface to which it is secured. The absence of such a strap swivel stud and mounting plate in the prior art is evidence of its novelty. The absence of such a stud and mount in the prior art precludes a finding of obviousness in view of the prior art for the providing of such a stud and mount for the purpose of securing a stabilizer strap or tether to a flexible surface of a hand held device.

BRIEF DESCRIPTION

The strap swivel mounting stud of this invention, in its simplest form is a one piece swivel stud and mounting plate comprising a stud having a longitudinal axis and a free end and a plate end and the longitudinal axis is perpendicular to a plate which lies in a plane which is perpendicular to the long axis of the stud and the stud and the plate are formed of a single piece of plastic material, and the base end of the stud terminates in the base and the stud defines a swivel pin receiving bore, said bore having an axis that is perpendicular to the longitudinal axis of the stud and intersects the longitudinal axis of the stud at a location near the free end of the stud and the plate is of a thickness in at least a portion of the plate that permits that portion of the plate to flex in response to the flexing of a structure to which the base is attached.

BRIEF DESCRIPTION OF THE DRAWINGS

FIG. 1 is a perspective of a strap swivel mounting stud and mounting plate made according to this invention.

FIG. 2 is a sectioned elevational view of the stud and mounting plate of FIG. 1.

DETAILED DESCRIPTION

Figure 3:
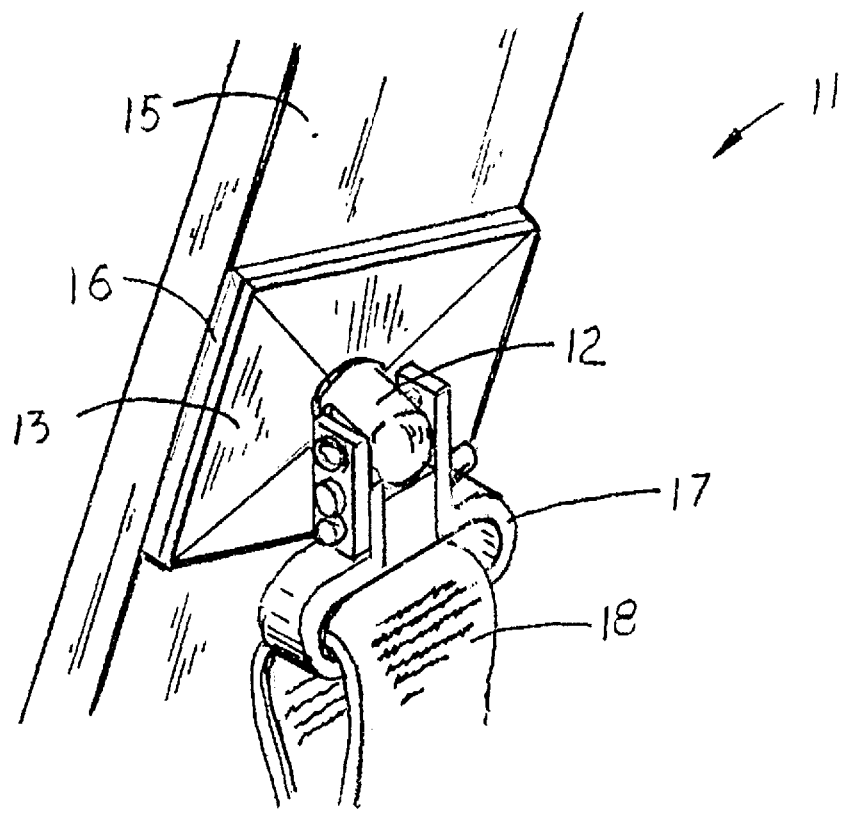
FIG. 3 is a fragmentary pictorial view of the swivel mount of this invention attached to the limb of a bow.

In the drawings, like numbers refer to like objects and the proportions and thicknesses of some elements have been modified to facilitate illustration.

Referring now to FIGS. 1 and 2 wherein a swivel mounting stud of this invention is shown in its simplest form. Swivel mount 1 is a one piece unit formed of plastic material which is stiff in thick sections and is flexible in thin sections. Swivel mount 1 has stud member 2 which is of a thick section, and plate member 3 which is of a thin section. In the range of expected loading, stud member 2 can be said to be rigid, and plate member 3 can be said to be flexible. Stud member 2 defines a transverse bore 4 which intersects the longitudinal axis of stud member 2 at right angles and is sized to receive the pivot pin of a strap swivel such as the strap swivel made by Boonie Packer Products of Salem Oreg.

The swivel mount of this invention will hereinafter be described as it would be applied in conjunction with a bow and a bow stabilizer. However, it should be understood that it is within the scope of this invention to employ the swivel mount of this invention to any device that can beneficially employ a detachable strap.

Figure 4:
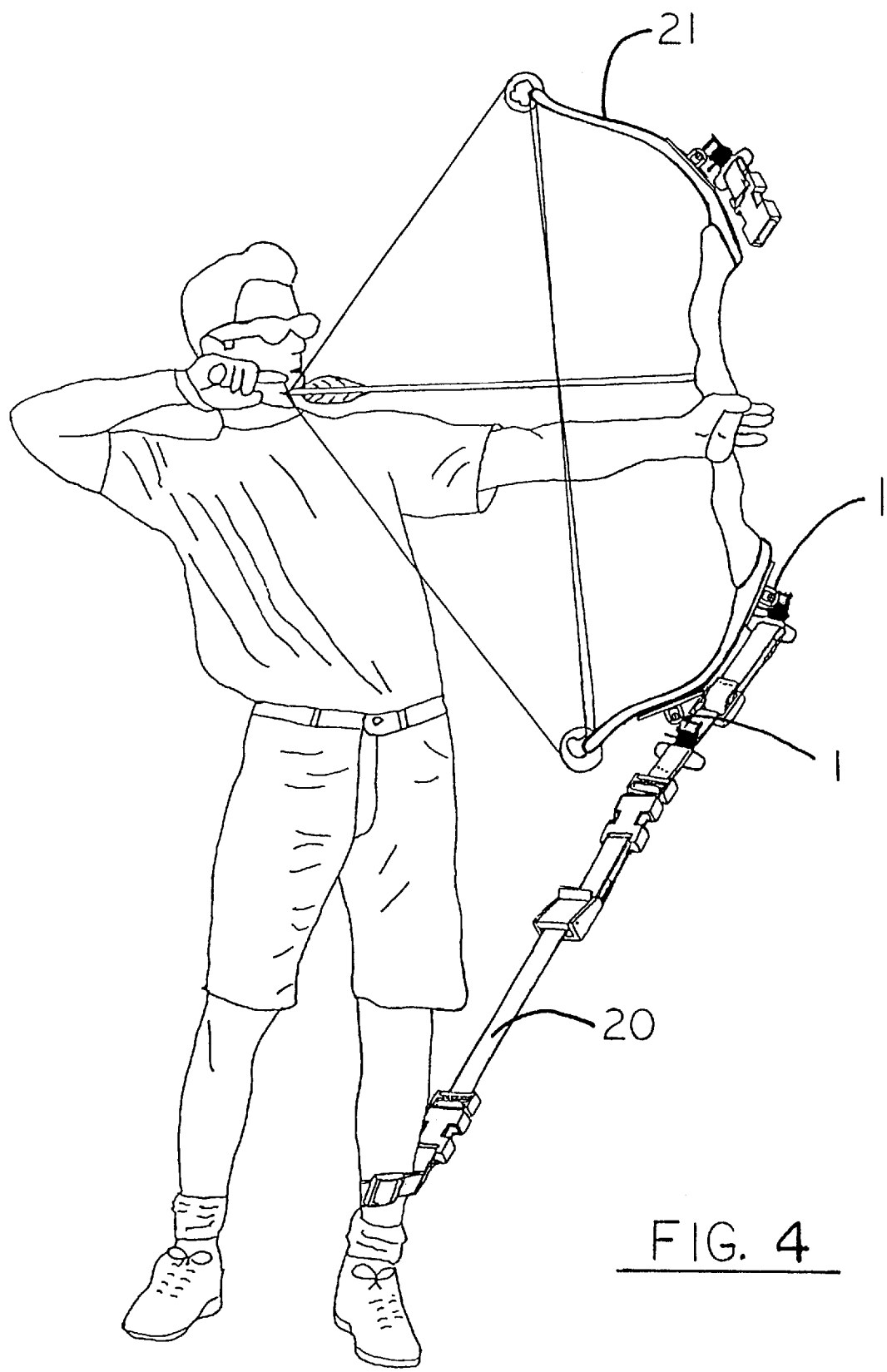
FIG. 4 is a pictorial view of a bowman in a standing position drawing a bow wherein a multiplicity of the swivel mounts of this invention are employed.
Figure 5:
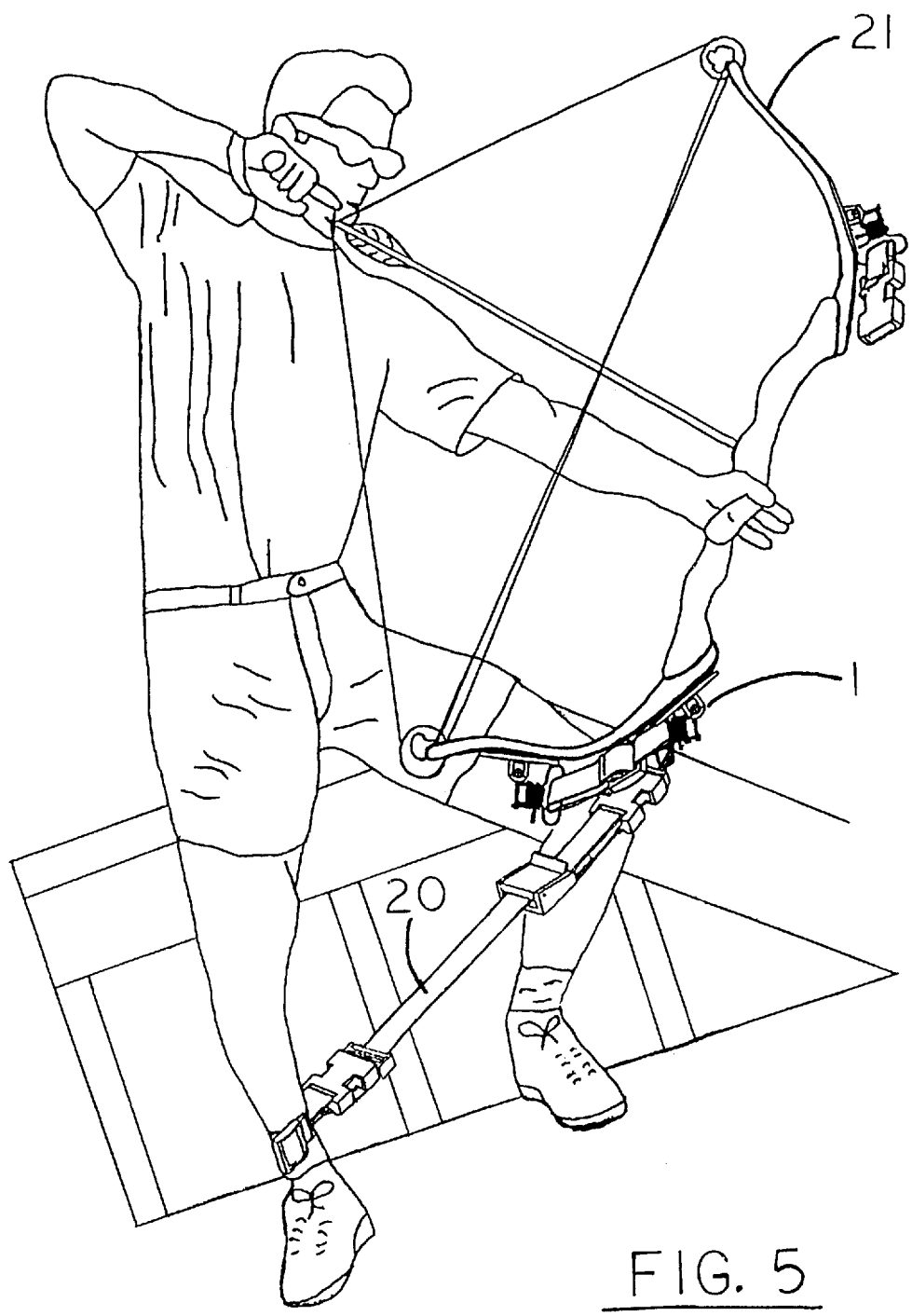
FIG. 5 is a pictorial view of a bowman in a seated position wherein a swivel mount of this invention is used to secure a stabilizing strap to a bow so as to permit the stabilizing of the bow in an unconventional position.

An understanding of the utility, novelty, and unobviousness of the swivel mount of this invention can be had from the illustrations in FIGS. 3–5.

Referring now to FIG. 3 where swivel mount 11, stud member 12, and plate member 13 correspond to elements 1–3 of FIGS. 1 and 2. Swivel mount 11 is formed of a plastic material that has the properties of being rigid in thick sections and being flexible in thin sections. There are numerous such plastic materials. For example, polyesters such as those sold by the DuPont Corp. under the brand name Hytrel, are plastic materials that have been found to be suitable for use in forming swivel mount 11 for the application shown. As shown, bow limb 15 is slightly curved and the curvature will be expected to change in a narrow range of flexure which is a characteristic of limb 15 at the location of attachment. The thickness and taper of plate member 13 is selected so that plate member 13 can accommodate to and conform to the curvature of limb 15 to insure a secure and even attachment and to permit plate member 13 to flex in harmony with the flexing of limb 15. Plate member 13 is secured to limb 15 by means of adhesive 16. Adhesive 16 may be any suitable contact adhesive. A preferred adhesive is the double faced adhesive foam, type 4956 sold by the 3M Corp.

When plate member 13 is secured to bow limb 15 by means of adhesive 16 as described above, stud member 12 acquires the attributes of a rigid stud which is an integral part of bow limb 15. Stud member 12 is then in a configuration to receive a strap swivel such as strap swivel 17 to which stabilizing strap 18 may be attached.

Where the application makes it necessary or desirable to do so, plate member 13 may be cut or trimmed to fit a profile or to conform to an irregular profile.

The swivel mount of this invention provides utilities that have not heretofore been practical to achieve in prior art stabilizers for hand held devices. For example, a photographer may want to turn his camera sideways for a particular shot. It is a simple matter to attach swivel mounts to several locations on the camera so that a stabilizing strap can be moved from one location to another. This same situation has been found to be present in the bow stabilizer of Herminath et. al.

Referring now to FIGS. 4 and 5 wherein swivel mounts 1 have been employed to attach a stabilizing strap 20 to bow 21. In FIG. 4, the configuration of bow 21 and stabilizing strap 20 are similar to the teachings of Herminath et al. In FIG. 5 the attachment point of stabilizer strap 20 has been shifted to near the archer's hand to permit the bow to be rotated out of a vertical plane as might be required when the archer is seated or is crouching or kneeling to fire from a position that does allow the archer to make a conventional draw.

The above disclosures are enabling but are not exhaustive of the variants that are available to one practicing this invention. A recitation of these variants would greatly multiply the drawings and claims and cause the specification to become prolix. Therefore it should be understood that the scope of the invention should not be limited to the scope of the disclosed embodiments, but rather, the scope of the invention should only be limited by the scope of the appended claims and to all equivalents that would become apparent to one skilled in the are.

What is claimed is:

1. A one piece strap swivel mount comprising:
    a) a strap swivel receiving stud that is rigid, projecting from a mounting plate that is flexible, and the stud has a longitudinal axis and the mounting plate has a plane, and the longitudinal axis of the stud is perpendicular to the plane of the mounting plate and the stud has a mounting plate end and a free end and the stud defines a bore located near said free end and said bore has an axis and the axis of the bore intersects the longitudinal axis of the stud at right angles and the thickness of the mounting plate is tapered in at least one direction from the stud so that the thickness of the mounting plate is thicker near said stud than the thickness of the mounting plate near an edge of the mounting plate that lies in said direction from said stud.

2. The swivel mount of claim 1 wherein the swivel mount is formed of a single piece of molded plastic material.

3. The swivel mount of claim 1 wherein the swivel mount is securable to a flexible surface of a hand held instrument by means of an adhesive.

4. The swivel mount of claim 3 wherein said adhesive is a foam adhesive tape.

5. The swivel mount of claim 1 wherein said swivel mount is one of a multiplicity of such swivel mounts secured to a hand held device.

6. The swivel mount of claim 5 wherein said hand held device is a bow and at least one of said swivel mounts is secured to a lower limb of said bow at a location near to a grip of said bow.

7. A one piece strap swivel mount and bow combination, comprising:
    a) a swivel mount having a strap swivel receiving stud that is rigid, projecting from a mounting plate that is flexible, and the stud has a longitudinal axis and the mounting plate has a plane, and the longitudinal axis of the stud is perpendicular to the plane of the mounting plate and the stud has a mounting plate end and a free end and the stud defines a bore located near said free end and said bore has an axis and the axis of the bore intersects the longitudinal axis of the stud at right angles and the thickness of the mounting plate is tapered in at least one direction from the stud so that the thickness of the mounting plate is thicker near said stud than the thickness of the mounting plate near an edge of the mounting plate that lies in said direction from said stud and the swivel mount is formed of a polyester by the process of injection molding,
    b) a bow having a grip, and an upper limb and a lower limb extending from the grip, and the swivel mount of this invention secured to said lower limb by means of adhesive bonding with a foamed adhesive tape.

* * * * *